United States Patent [19]
El-Ghoroury et al.

[11] Patent Number: 5,867,400
[45] Date of Patent: Feb. 2, 1999

[54] APPLICATION SPECIFIC PROCESSOR AND DESIGN METHOD FOR SAME

[75] Inventors: Hussein El-Ghoroury, Carlsbad; Dale A. McNeill, Encinitas; Charles A. Krause, Carlsbad, all of Calif.

[73] Assignee: International Business Machines Corporation, Armonk, N.Y.

[21] Appl. No.: 737,992

[22] PCT Filed: May 17, 1995

[86] PCT No.: PCT/US95/05964

§ 371 Date: May 19, 1997

§ 102(e) Date: May 19, 1997

[87] PCT Pub. No.: WO95/31778

PCT Pub. Date: Nov. 23, 1995

[51] Int. Cl.⁶ ................................................. G06F 15/00
[52] U.S. Cl. ............................................ 364/490; 395/701
[58] Field of Search .................................. 395/376, 379, 395/800, 701; 364/488, 489, 490, 491

[56] References Cited

U.S. PATENT DOCUMENTS

| | | |
|---|---|---|
| 4,951,221 | 8/1990 | Corbett et al. . |
| 5,047,949 | 9/1991 | Yamaguchi et al. . |
| 5,119,314 | 6/1992 | Hotta et al. . |
| 5,173,864 | 12/1992 | Watanabe et al. . |
| 5,197,016 | 3/1993 | Sugimoto et al. . |
| 5,283,753 | 2/1994 | Schucker et al. . |

OTHER PUBLICATIONS

"Advanced Computer Architecture" Hwang, pp. 308–309 and 437–445 (1993).
"Introduction to 8080/8085 Assembly Language Programming" Employees of Borland, p. 154 (1990).

*Primary Examiner*—Kevin A. Kriess
*Attorney, Agent, or Firm*—Blakely, Sokoloff, Taylor & Zafman LLP

[57] ABSTRACT

The architecture and design method of an application specific processor having an instruction set which is matched to the needs of a specific application is provided. The application specific processor design method is based on using a library of pre-designed function blocks (111–113). These pre-designed function blocks encapsulate complex processing functions most commonly used by a specific application. Each of the pre-designed application specific function blocks is designed such that values of certain parameters of the encapsulated processing algorithm are implemented using registers which can be programmed with any desired value. Each of the pre-designed application specific function blocks is designed such that it can interface with a multi-purpose bus (110) through which the function block can accept invocation, reconfiguration, and data input/output routing commands.

29 Claims, 8 Drawing Sheets

APPLICATION SPECIFIC PROCESSOR AND DESIGN METHOD FOR SAME

BACKGROUND OF THE INVENTION

This invention relates generally to complex application specific integrated circuits and more particularly to a distributed parallel processor architecture and design method which allows such complex integrated circuits to be easily designed.

Integrated circuit technology has advanced in the integration of gates from a small number (fewer that one hundred transistors) to a very large number (millions of transistors). As a result, it is possible to make integrated circuits (ICs) which perform increasingly complex functions and thereby to replace a large number of discrete components, with commensurate benefits in size, cost, and reliability. However, the complexity of the circuits and the large number of available transistors make designing ICs more difficult. Consequently, tools have been developed to help IC designers to design ICs in a more efficient manner. The aim of such tools is to make it easier for the designer to synthesize the target logic without the need to manipulate transistors or gates.

In general purpose processor architecture, primitive low-level instructions (such as add, multiply, compare, etc.) are implemented in hardware which can be sequenced into a programmed set of instructions to implement a complex function. Such an architecture is limited by the throughput achievable by the central processing unit (CPU) which must meet the peak throughput needs for a series of operations. Such a limitation often places a great demand on the hardware and results in inefficiencies in the utilization of designed hardware. In addition, power management of such a centrally controlled architecture is normally difficult.

In order to meet the design throughput goals with an efficient hardware implementation, designers often opt to use application specific integrated circuits design techniques at the cost of sacrificing the system design flexibility offered by post-synthesis programmability.

In general, two approaches have been developed to help IC designers—"standard cell" and "gate array" technologies. These technologies are discussed generally in U.S. Pat. Nos. 5,119,314 (Hotta et al.), 5,173,864 (Watanabe et al.), 5,197,016 (Sugimoto et al.), and 5,283,753 (Schucker et al.). In the standard cell approach, commonly used logic blocks are carefully designed and stored in a cell library. Designers can retrieve and interconnect appropriate logic blocks so as to provide desired functions. Typically, these blocks are primitive logic structures, such as NAND or NOR gates, or other simple logic blocks, such as an adder or multiplier. Logic blocks can be interconnected by routing conductors between the appropriate input/output terminals of the blocks.

Gate array technology involves the fabrication of a large number of base wafers containing identical integrated circuit elements (gates) up to but not including the first level of conductive interconnect. IC designers "customize" the gate array by specifying only the conductive patterns used to interconnect the pre-fabricated gates.

One of the problems with both these approaches is that it is difficult to use them to design ICs which perform complicated functions. This is because the standard cells and gate arrays are primitive or simple logic blocks for all types of applications. Consequently, it takes a lot of time, skill, and effort to integrate these basic building blocks into useful application specific integrated circuits. In addition, the layout and timing constraints and the design effort required to interconnect these logic blocks normally limit the designers freedom and increase the design time.

As an example, circuits used for communication applications typically perform complex signal processing operations. Examples of such circuits are finite impulse response filters, infinite impulse response filters, demodulators, and correlators. These circuits incorporate complicated mathematical algorithms which could be understood and designed only by extremely skilled engineers. Consequently, it is very tedious to implement these circuits using the primitive building blocks available with standard cell and gate array technologies.

Some of the layout constraints associated with the design of complex integrated circuits using standard cells and gate array design methods are dealt with in Schucker et al. The block architectured integrated circuit design approach described therein allows for re-use of earlier developed logic blocks, but it does not address the complexity of interconnecting the various logic blocks. In addition, the described integrated circuit design approach does not provide for power management, which is an important factor for complex ICs incorporating a large number of gates.

Some electronic system manufacturers take a completely different strategy to solve the aforementioned problem. Instead of relying on custom designed ICs, they use general purpose ICs, such as microcontrollers and digital signal processors. These ICs are able to execute a large number of instructions per second. Typically, software is used to customize the function of these ICs.

One of the problems of using these general purpose ICs is that they cannot attain throughput comparable to that of an application specific IC. In many applications where processing speed is a crucial factor, such as high speed communication systems, the performance of general purpose ICs is not acceptable. Further, the use of software does not change the requirement that extremely skilled engineers are needed to implement the complicated processing algorithm.

Sugimoto et al. discloses a computer-aided system and method for designing application specific integrated circuits incorporating a general purpose processor and a plurality of logic blocks connected together on a multiplicity of data, address, and control busses. This design approach suffers from several drawbacks. First, it lacks the ability to perform post-synthesis programming for the logic blocks synthesized by the integrated silicon-software compiler into hardware blocks; namely the primitive support functions, such as comparators, adders, multipliers, and counters, which are incorporated to enhance the system throughput. In addition, the processing needs of complex algorithms are still implemented in software and thus require a skilled designer for a complex system. In addition, the integrated circuit design approach described in Sugimoto et al. does not incorporate provision for power management.

Hence, a need exists for a block architectured application specific integrated circuit and design method that allows effective encapsulation of complex application specific processing into function blocks which can be re-used from one design to another, but can be post-synthesis programmed to meet the evolution enhancement and upgrade needs of the specific application with power efficient integrated circuit design.

SUMMARY OF THE INVENTION

The invention comprises an application specific processor (ASP) architecture (which can be implemented on a single chip) and design method utilizing an application specific instruction set each instruction specifying a high-order operating and processing function useful for a specific class of applications. The processing needs of a specific class of applications (e.g., communication products) are first analyzed and grouped into operations and processing algorithms most commonly used by the application into function blocks so as to capture a highly complex, but frequently used, type of data transformation into a single function block. Each of the function blocks corresponds to an application specific instruction of the set. These application specific instructions are implemented as hardware function blocks that are designed to be interconnected by a multi-purpose bus. In use, the interconnected hardware function blocks are sequenced in accordance with a program of instructions specified by a designer to implement the specific application. Within many of the function blocks, values of certain parameters of the processing algorithms implemented by the blocks are specified using registers which can be programmed with one of a plurality of possible values. Hence, each of the function blocks can be viewed by the designer as a parametrically-programmable application specific high-order operation or instruction.

Each of these function blocks contain a multiplicity of low-order processing primitives which are arranged and grouped together to form an application specific higher_order operation. Because each of these function blocks is a high-order operation for a specific application, these function blocks may be viewed as forming the "syntax" of an application specific language, i.e. the function blocks comprise the pieces of code used in an application specific language for programming the operation of the ASP. Hereinafter, the function blocks utilized by the system and method of the present invention are referred to interchangeably as an "application syntax" or "application element." Each application syntax in the library also includes an interface block for interfacing the function block to the multi-purpose bus.

The application syntax can be viewed as building blocks of an integrated circuit and are pre-designed, implemented, and optimized for a target technology (for example, a specific microelectronics integration technology, such as CMOS).

The pre-designed application specific function blocks (application syntax) are grouped in a design library to facilitate the design process of an ASP of the present invention as follows. A designer first analyzes the design requirements of a specific application and describes them in terms of a subset of application specific function blocks selected from the library as if he were writing a program using the application specific instructions. The selected function blocks are then interconnected by means of a standard multi-purpose bus interface embedded within each function block. The integrated design can then be synthesized into a programmable ASP integrated circuit. Post-synthesis tailoring of the synthesized ASP integrated circuit is accomplished using an instruction program that sequentially invokes each application specific function block and provides each function block with reconfiguration and data input/output routing commands. A power management design provision is incorporated within the design of each application specific function block allowing the majority of the function block logic to be turned on only during the time required the execute a received an invocation command.

Design of ASPs according to the present invention is simplified by a high order programming language so that a designer can convert system level requirements directly to an ASP implementation without an in-depth knowledge of the complex algorithms associated with each application syntax. Using this language, an ASP according to the present invention may be designed with a simple program that specifies the relationship between the different application syntax, the parameters of each application syntax, including input and output location, configuration, and the time each application syntax is invoked relative to the multi-purpose bus clock. Parameters not specified are set to pre-defined default values.

The ASP architecture and design method of the present invention can be used to design a large variety of products. For example, if the library contains communication system related application syntax, it can be used to design products for cellular telephones, wireless local area networks, personal communication networks, and digital cable networks. As a result, the costs of designing the application syntax can be amortized among many users of the library.

The method of the present invention also provides for a simplified, high-level design technique for ASPs. Each application syntax may be considered a "black box," with pre-defined input and output characteristics. Thus, there is no need for designers of the library to have an in-depth understanding of how to implement these complex application specific functions. Designers need only work with system level building blocks or application syntax. It is much easier and faster to design systems using these application syntax than to implement the same functionality by selecting, arranging and connecting standard cells or interconnecting thousands of gates. As a result, the costs and time-to-market of designing a product are significantly reduced.

In addition, the costs of product enhancement and evolution are reduced by the ASP and design method of the present invention. Using the disclosed ASP architecture, application syntax library, and design method, it is quite easy to change or add features to the product by removing and inserting application syntax and then re-synthesizing a new version of the application specific integrated circuit. There is no need to re-design an entire system. In addition, because of the post-synthesis programmability inherent within the design of each application syntax, product enhancement can be achieved by re-programming the implemented ASP without the need for re-synthesis. Thus, the costs of product enhancement and evolution are drastically reduced.

The interconnection between the application syntax of the present invention allows for loose coupling using a single multi-purpose bus such that a set of application syntax can operate asynchronously. Each application syntax on the multi-purpose bus can be invoked simultaneously (parallel processing) or be staggered in time (pipeline processing). In addition, the application syntax is enabled only at a time when its processing function is needed. Because the power usage of an application syntax depends on whether it is enabled, this feature allows for an inherent efficient power management.

The multi-purpose bus is used to carry both commands and data. The commands and data are paired such that they are transferred simultaneously by a single access to the multi-purpose bus. The number of words in the bus allocated to the commands and data can vary in each access. This "moving boundary" feature allows maximization of the efficiency of the multi-purpose bus.

The architecture of the present invention also allows for distributed control whereby each application syntax is capable of generating and sending commands and data to other application syntax. Thus, no central controller is required. This distributed control approach allows efficient implementation of highly time ordered, multi-mode application specific processing. However, the architecture of the present invention also allows for the use of an application syntax to control the operation of several other application syntax in the ASP. When one application syntax becomes a central controller for a group of other application syntax, the controlled application syntax are designated as an application syntax "cluster." In this manner, application syntax with wide interface bandwidth needs may be interconnected as a group with a single physical interface which is separate from the above described multi-purpose bus. This application syntax clustering allows the interconnect interface bandwidth to be tailored for matching the bandwidth of data flow within the integrated circuit. This feature avoids data flow congestion.

One of the applications of the application syntax is in the area of digital communication. The application syntax comprise complicated algorithms, such as digital filters, correlators, demodulators, error correction, etc. In the architecture of the present invention, a communication system designer does not have to understand the details of these algorithms. The designer merely integrates appropriate application syntax together and can easily design complicated communication application specific integrated circuits for diverse products, such as a spread spectrum, frequency hopping, and time division multiple access modems.

Other aspects and advantages of the present invention will become apparent from the following description of the invention, taken in conjunction with the accompanying drawings and tables, which disclose, by way of example, the principle of the invention.

DETAILED DESCRIPTION OF THE INVENTION

The present invention is a processor architecture and design method in which a plurality of functional elements, each designed to performed a specific function, are connected together to cooperatively perform a task. The architectural context in which these functional elements are integrated and the aggregation of the functional elements in order to perform the application dependent processing is referred herein as an application specific processor (ASP).

Figure 1:
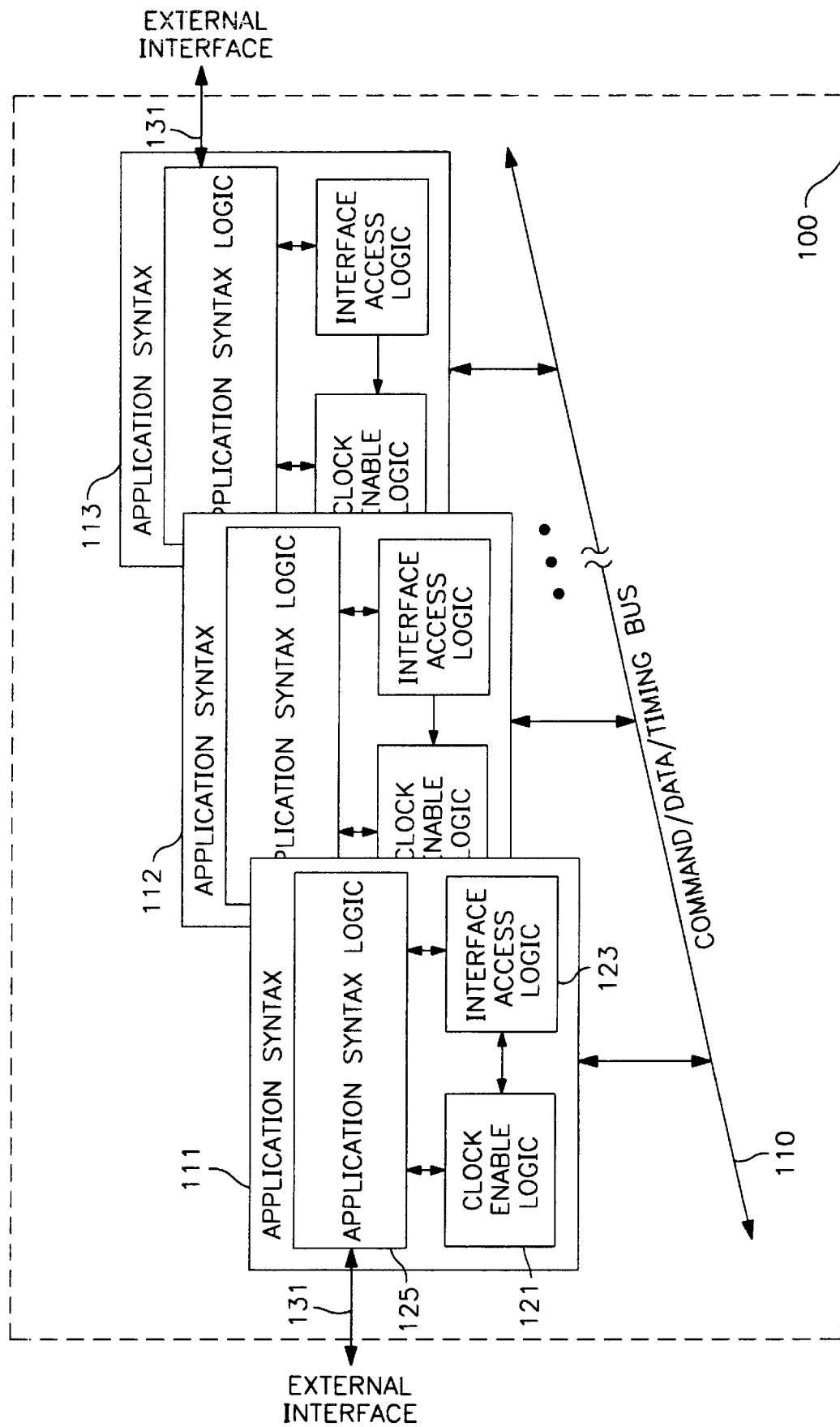
FIG. 1 is a drawing showing the application specific architecture of the present invention.

FIG. 1 is a schematic diagram of the ASP architecture 100 of the present invention. It shows a Command/Data/Timing bus 110 and a plurality of application syntax, such as application syntax 111, 112, and 113. These application syntax could be different, or some of them could be the same. Communication between the application syntax are carried out through the Command/Data/Timing bus 110.

Each application syntax contains essentially the same circuits for interfacing with the Command/Data/Timing bus 110. Thus, it is sufficient to describe in detail the interface circuits of only one of the application syntax, such as application syntax 111. Application syntax 111 contains a clock enable logic block 121, an interface access logic block 123, and an application syntax logic block 125. The application syntax logic block 125 performs a predefined function. For example, FIG. 1 indicates that the application syntax logic block 125 operates on user data that is supplied to the application syntax 111 through a bidirectional path designated the external interface 131 line. The clock enable logic block 121 and interface access logic block 123 interface the application syntax logic block 125 to the Command/Data/Timing bus 110. The clock enable logic block 121 provides the application syntax logic block 125 with timing signals and enables the application syntax logic block 125 only at the time when its function is needed. The interface access logic block 123 allows application syntax logic block 125 to receive commands and data from, and send commands and data to, other application syntax via the Command/Data/Timing bus 110.

In the ASP architecture 100, the structures of the clock enable block 121 and interface access logic block 123 in each application syntax are substantially the same, although some unique components, such as the application syntax's address, are different. Some of the components in the application syntax block 125 are also common to all the application syntax (e.g., components interfacing with the clock enable block 121 and interface access logic block 123). However, circuits in the application syntax which perform specific data and signal processing functions may be different (e.g., one application syntax functions as a demodulator, another functions as a correlator, etc.). Briefly stated, the application syntax may perform different functions, but the portions of the application syntax for interfacing to the Command/Data/Timing bus 110 are substantially the same. As a result, the application syntax can interface to one another using the Command/Data/Timing bus 110.

Figure 2:
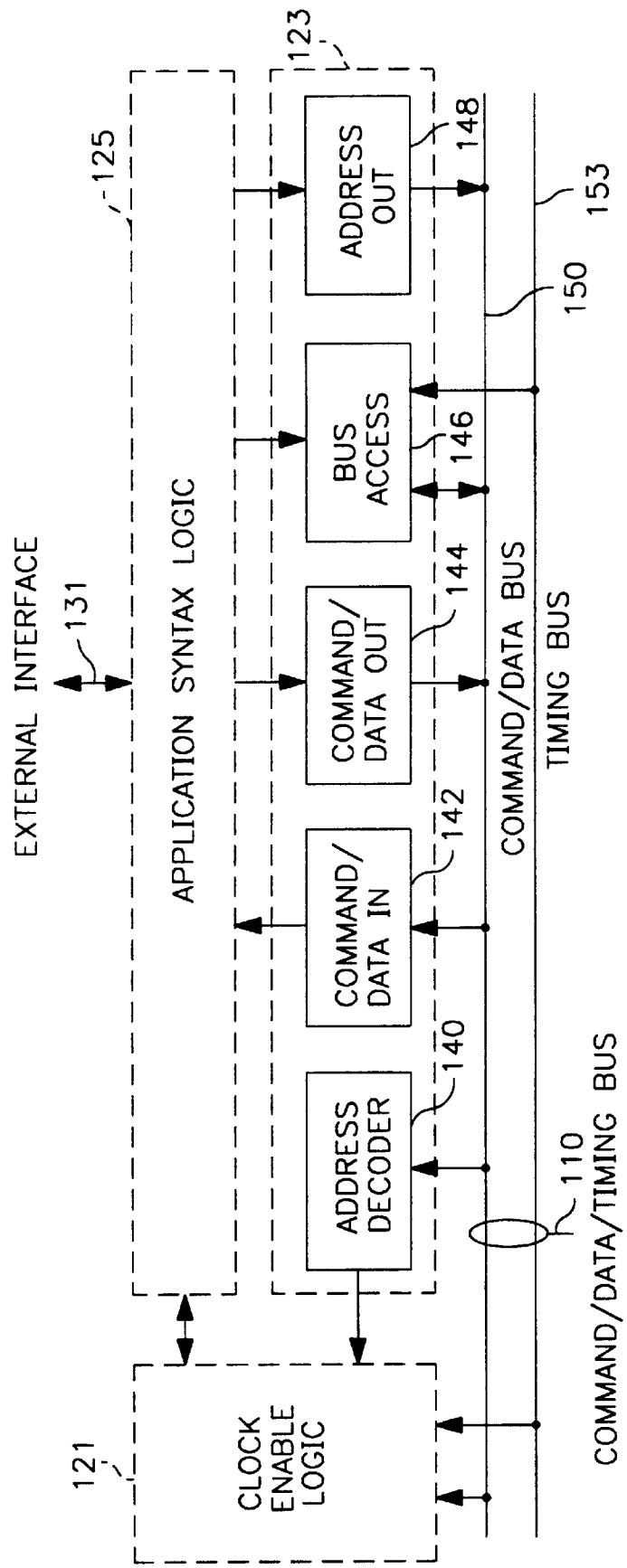
FIG. 2 is a drawing showing an interface access logic block in an application syntax of the present invention.

FIG. 2 shows a detailed block diagram of the interface access logic block 123, shown in FIG. 1. Like numerals in FIGS. 1 and 2 denote like elements. The interface access logic block 123 contains an address decoder 140 connected to a command/data in block 142 and the clock enable logic block 121. The address decoder 140 receives address signals from the command/data bus 150 and causes the command/data in block 142 and the clock enable logic block 121 to accept commands and data which are intended for application syntax 111. The command/data bus 150 is a part of the Command/Data/Timing bus 110, shown in FIG. 1. The command and data processed by the command/data in block 142 is sent to the application syntax block 125. The interface access logic block 123 also contains a command/data out block 144 and an address out block 148. These two blocks transmit the command, data, and address information generated by the application syntax logic block 125 to the command/data bus 150. The interface access logic block 123 also contains a bus access circuit 146 which is connected to the command/data out block 144 and address out block 148.

The two command/data blocks 142 and 144 operate on an input/output format which consists of a pair of command and data, each of varying size. The aggregate size of the command and data are based on the operational needs of the specific application syntax logic. The described command and data pairing has moving boundaries which allows maximization of the physical interface (i.e., Command/Data/Timing bus 110) efficiency.

Because the structure of the interface access logic block 123 is substantially the same for all the application syntax, it is possible for one application syntax to send commands and data to another application syntax through the Command/Data/Timing bus 110. This "data driven" distributed control approach allows efficient implementation of highly time ordered, multi-mode application specific processing. Thus, in this architecture, there is no need for the control approach to be restricted to a fully centrally controlled approach; rather a distributed control, centralized control, or a hybrid control approach can be used to best match the needs of the intended application. The ability of an application syntax to generate commands to other application syntax allows one application syntax to become a central controller for a group of other application syntax, which are designated as an application syntax cluster.

Another advantage of this architecture is that the Command/Data/Timing bus 110 is hidden from the application syntax logic (i.e., the application syntax logic need not know the details of the bus operation). Thus, the designer of the specific function for an application syntax does not have to know the bus operation and as a result, there is a gain in economy.

Figure 3:
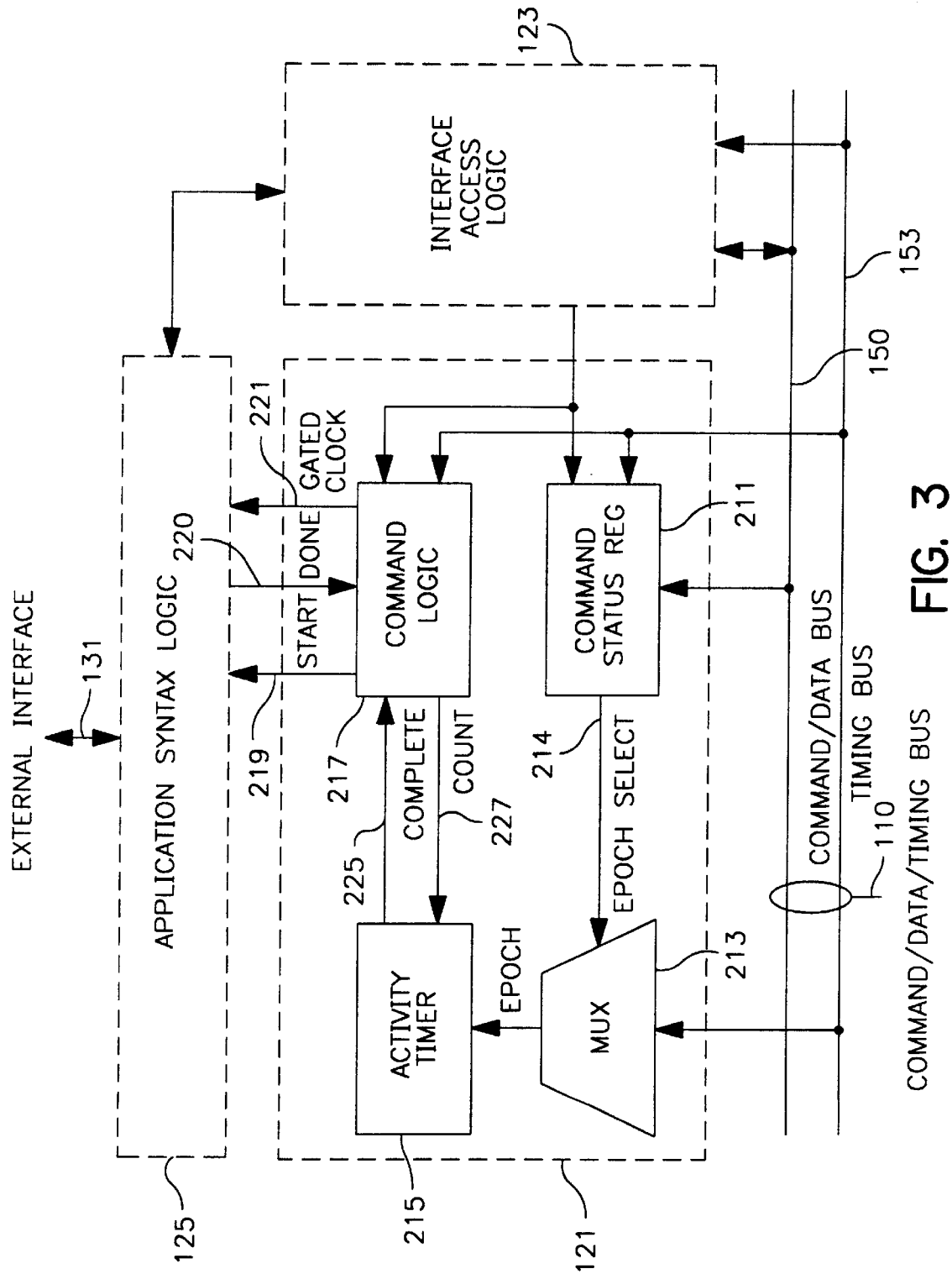
FIG. 3 is a drawing showing a clock enable logic block in an application syntax of the present invention.

FIG. 3 shows a detailed block diagram of the clock enable logic block 121, shown in FIG. 1. Like numerals in FIGS. 1, 2 and 3 denote like elements. The clock enable logic block 121 contains a command status register 211 which accepts input from the timing bus 153, the command/data bus 150, and the address decoder 140 of the interface access logic block 123. The timing bus 153 is a part of the Command/Data/Timing bus 110 and typically contains a plurality of clock signals carried on different lines.

The command status register 211 receives time-related commands and data which are addressed to application syntax 111. The command status register 211 uses these commands and data to determine a mux select value and a epoch modulo value. The mux select value is sent to the multiplexer 213 through a set of mux select lines 214 so that the multiplexer 213 can select the desired clock (or epoch) from the timing bus 153. The epoch modulo value is sent to a command logic block 217 and defines the modulo therein (i.e. number of epochs to count before enabling a gated-clock), as explained below.

The output of the multiplexer 213 is connected to an activity timer 215. The activity timer 215 also receives a "count" signal from the command logic block 217 through a line 227. This count signal corresponds to the epoch modulo value, described above, in the command logic block 217. The activity timer 215 uses this count signal to count the epochs (selected by the command status register) and sends a "complete" signal through a line 225 to the command logic block 217. The command logic block 217 then enables a gated-clock and generates a start signal (synchronous to the gated-clock). The start signal and gated-clock are coupled to the application syntax logic block 125 via lines 219 and 221, respectively. The command logic block 217 receives a "done" signal from the application syntax block 125 via a line 220. The command logic block 217 also contains circuits which allow it to enable and disable the gated-clock via commands from the command status register 211.

The clock enable logic block 121 causes the application syntax logic block 125 to be activated at specific occurrences of the specified timing epoch. For example, the clock enable logic block 121 can be configured to activate the application syntax logic block 125 at predefined epochs and disable the gated-clock during idle times, thereby limiting power dissipation of the application syntax 111. Furthermore, the clock enable logic block 121 allows the autonomous operation of the application syntax based on timing epochs distributed throughout the system. Thus, by allowing each application syntax to be enabled only at the time when its function is needed to be invoked, both the time ordering of data processing and efficient power management become inherent aspects of the architecture.

Figure 4:
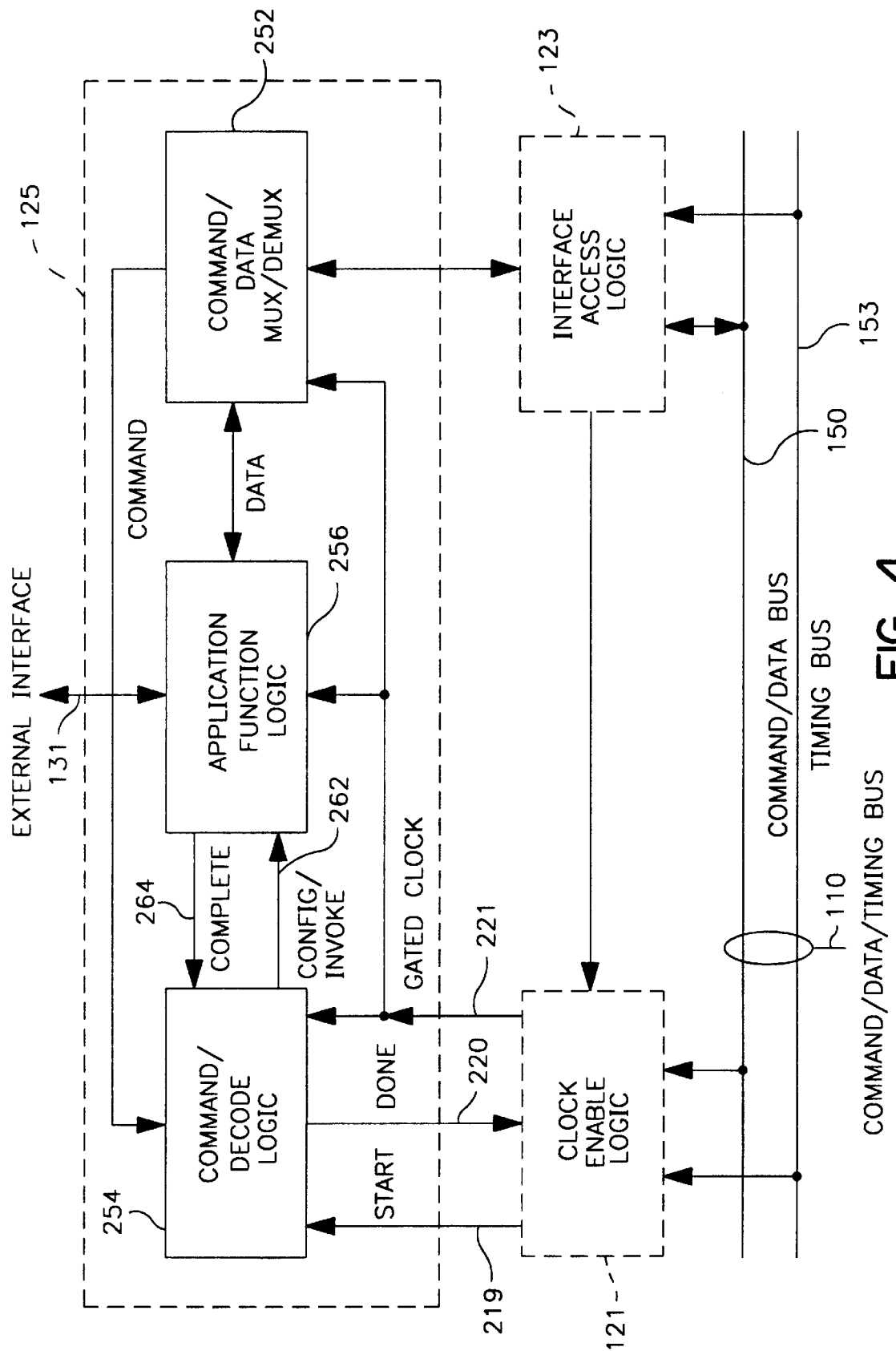
FIG. 4 is a drawing showing an application syntax logic block in an application syntax of the present invention.

FIG. 4 shows a detailed block diagram of the application syntax logic block 125, shown in FIG. 1. Like numerals in FIGS. 1, 2, 3 and 4 denote like elements. The application syntax logic block 125 contains an application function logic block 256 which performs predefined functions unique to an application syntax, such as transformation of the user data supplied via the external interface 131 line. That is, application function block 256 contains circuits which are not part of the interface structure common to all application syntax. Application syntax logic block 125 also contains a command/data mux/demux block 252 which receives commands and data from the interface access logic block 123 and the gated-clock signal from the clock enable logic block 121. The command/data mux/demux logic block 252 extracts commands (for delivery to a command/decode logic block 254) and data (for bi-directional communication to an application function logic block 256) received from the interface access logic block 123.

The command/decode logic block 254 can be considered the controller of the application logic block 125. It controls the operation of the application syntax function logic block 256 via a line 262. That is, command/decode logic block 254 accepts commands from the interface access logic block 123 via the command/data mux/demux block 252, interprets those commands, and controls the operation of the application function logic block 256. An example of the operations are (i) configuring the application function logic block 256, and (ii) invoking a particular predefined transformation of the user data supplied by the external interface 131 line. Upon completion of a command, the application function logic block 256 sends a "complete" signal to the command/decode logic block 254 via a line 264.

As explained above, the start signal on 219 received by the command/decode logic block 254 is used to synchronize the invocation of the application function logic block 256. The command/decode logic block 254 also generates a "done" signal and transmits it (via line 220) to the clock enable logic block 121, which in turn disables the gated-clock to the command/decode logic block 254, the application function logic block 256, and the command/data mux/demux block 252. Disabling the gated-clock to these blocks essentially turns them off. Conversely, enabling the gated-clock turns them on.

As pointed out above, the application function logic block 256 in the application syntax is specifically designed to perform a predefined function. Each application syntax defines an application specific function which is a priori designed, implemented, and optimized for a target technology (for example, a specific microelectronics integration technology). A set of application syntax which perform different data and signal transformation functions can be put into a library. When it is time to design a system for a certain application (e.g., a modem for wireless communication), appropriate application syntax are selected from the library and placed on a Command/Data/Timing bus so that they can perform the desired function.

In the embodiment presented in FIGS. 1–4, the command arguments are transmitted on command/data bus 150 and processed by the interface access logic block 123 and the clock enable logic block 121. The time arguments are transmitted on the timing bus 153 and processed mainly by the clock enable logic block 121.

The ASP architecture allows a set of application syntax to be invoked simultaneously parallel processing), staggered in time (pipeline processing), or sequential in time (non-overlapping processing). This capability allows considerable flexibility in the system design choices. Invocations simultaneous in time (parallel processing) allow high processing throughput to be realized. Invocations staggered in time (pipeline processing) or sequential in time (non-overlapping processing) allow one application syntax to act as a preprocessor for another application syntax. The time (T) argument of each application syntax determines the alignment of invocation epochs to realize the most efficient processing relative to another application syntax.

Appropriate application syntax are selected from the library containing the complete set of available application syntax. The architectural design allows any set of application syntax to be interconnected in a fully connected topology, which permits data flow between any two application syntax. This interconnection is based on a loose coupling, whereby a set of application syntax can operate asynchronously.

Figure 5:
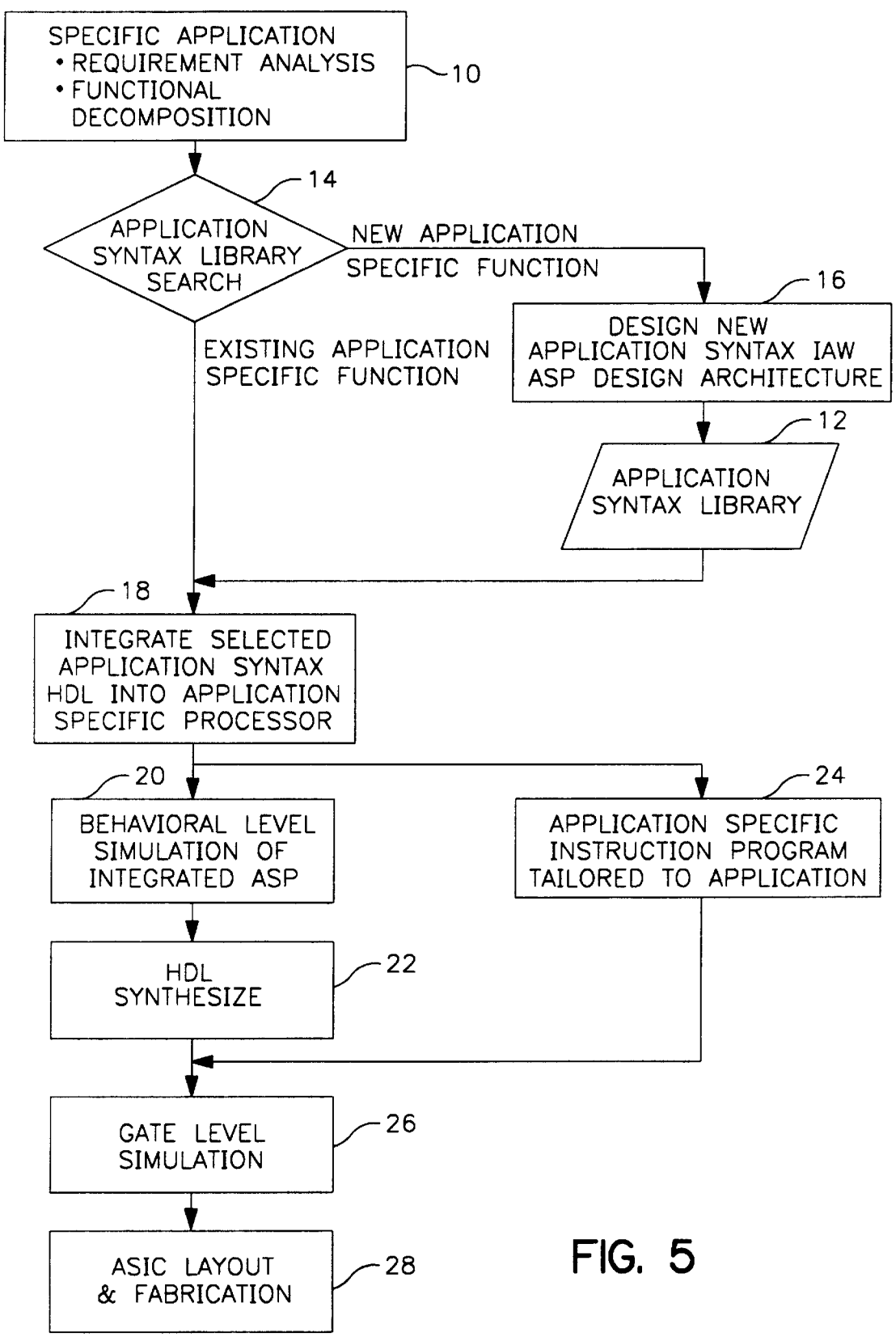
FIG. 5 is flow diagram showing the design method for the ASP.

A design method for the ASP integrated circuit of the present invention will now be described in detail with reference to the flow diagram shown in FIG. 5. First, the processing requirements of the target product are analyzed and decomposed into fundamental application specific processes, such as filtering, demodulation, deinterleaving, etc., for the case of communication products (Process 10). Next, the library of application specific function blocks 12 is searched in order to identify the subset of application syntax suitable for meeting the identified processing needs (Process 14). If a new or unique application specific processing function is identified not to be contained in the library, these new or unique application processing needs are implemented using hardware description language (HDL) into an application syntax which incorporate the aforementioned interface to the ASP multi-purpose bus (Process 16). The newly designed application syntax HDL together with the HDL of those pre-designed application syntax identified to exist in the library are integrated to form an HDL of the target ASP integrated circuit (Process 18).

Behavioral level simulation is performed in Process 20 in order to ascertain whether the internal and external interfaces are compliant with the design specifications. Concurrent with the behavioral level simulation conducted in Process 20, an application specific instruction program is designed, such that it can be used to sequence the operation of the selected application syntax in order to implement the processing requirement of the target application specific ASIC (Process 24). Next, the integrated HDL is synthesized with the appropriate computer-aided design (CAD) synthesis tool targeting the technology selected for implementation of the ASP (Process 22). In Process 26, the resultant logic is then combined with the application specific instruction program designed in Process 24 and simulated at the gate level in order to verify compliance with the target application specific requirements. Upon completion of adequate gate level logic simulation, the design is released for ASIC layout and fabrication (Process 28).

The application syntax library may be considered a collection of instructions in a programming language. A user can select the appropriate subset of instructions from the library to implement a programmable ASP which is matched to the intended application. The instruction set can be tailored to match the specific processing needs of a target application (for example, digital communications). The ASP Architecture is an architecture in which instructions in the instruction set can be combined to work in a cooperative manner to perform a certain application. The individual members of this application specific instruction set are designed in a manner which captures a highly complex, yet frequently used, type of data transformation into a single "syntax" which can be addressed as a primitive instruction at the application level. This type of syntax is referred to as an "application syntax" or "application element" as discussed above. Examples of the physical embodiment of these syntax are the application syntax 111, 112, and 113, discussed above in connection with FIGS. 1–4.

Within the ASP architecture, an application syntax is invoked with two sets of fundamental arguments, namely, command (C) and time (T). In terminology analogous to software programming, the structure of the syntax is "Syntax (C, T)." Each syntax, when invoked, transforms a designated input array, data structure, and/or commands into an output by applying an application specific transformation or mapping. The command (C) argument of a syntax allows specific control parameters embedded with the application syntax to be set at desired values and hence allows the transformation performed by an application syntax to be varied from one invocation to another without altering the type of functional transformation performed. For example, within a Communication Application Specific Processor (CASP), an application syntax can be defined to be a filter function with the command argument allowing the filter bandwidth to be varied. The time (T) argument of the syntax allows the application syntax to be invoked at specific time epochs, where the value of the argument (T) specifies the time at which the application syntax is to be invoked or the time interval between successive invocations. When implemented in hardware, each syntax, when invoked, transforms a designated input array, data structure, and/or commands into an output by applying an application specific transformation or mapping. The command (C) argument of a syntax allows specific control parameters embedded within the application syntax to be set at desired values and hence allows the transformation performed by an application syntax to be varied from one invocation to another without altering the type of functional transformation performed. For example, within a Communication Application Specific Processor (CASP), an application syntax can be defined to be a filter function with the command argument allowing the filter bandwidth to be varied. The time (T) argument of the syntax allows the application syntax to be invoked at specific time epochs, where the value of the argument (T) specifies the time at which the application syntax is to be invoked or the time interval between successive invocations.

Under the principles of the current invention, ASPs may be programmed both at the pre-synthesis and post-synthesis stages of their design. The overall design process, covering the requirements analysis, functional decomposition, application syntax library search, application syntax integration, etc., was described in detail in the context of FIG. 5 above. Pre-synthesis programmability refers particularly to the programmability provisions which allow the integrated circuit designer to further customize the design of each function block through adaptation of the HDL model of the function block. A summary of exemplary features that are either pre- or post-synthesis programmable are presented in Table 1 in the context of a PSK demodulator. One skilled in the art could readily appreciate that some features could be implemented to be either pre-synthesis or post-synthesis programmable, while other features would preferably be implemented at one stage, but not the other (e.g. in a modem, use of binary phase shift keying versus quaternary preferably invoked pre-synthesis, while modem baud rate programmed in post-synthesis). The implementation of pre-synthesis programmability could be as simple as arranging the HDL model in a highly modular and commented fashion in order that unwanted functionality could be commented out and custom functionality added; or, in a more elaborate fashion, precompiler flags or macros could be used to control the invocation of particular functionality through the setting of particular parameters.

As discussed above, values of certain parameters of the processing algorithms are implemented using registers which can be programmed with any desired values. Hence, each of the function blocks can be viewed as a parametrically programmable application specific high-order operation or instruction. This allows the application specific processor to be post-synthesis programmed to adjust the processing capability of each function block to the instantaneous needs of the specific application.

Furthermore, each function block can be post-synthesis programmed to control its invocation time relative to a timing signal supplied to the function block on the multi-purpose bus.

Also inherent within the design of each application specific function block is the ability to gate the clock signal off between successive invocations. In effect, therefore, the application specific processor architecture actually allows programmability of the clock signal to each function block in terms of both the on/off period as well as the invocation epoch.

TABLE 1

Application Syntax Programmability

| Layer | Functionality | Pre-Synthesis Programmability | Post-Synthesis Programmability |
| --- | --- | --- | --- |
| Application Layer | ● Application Function Logic (VHDL) with standard interfaces | ● Sample Bus Input Definition | ● Demod Type<br>● Symbol Rate |
| Control Layer | ● Command/Decode Logic<br>● Command/Data Mux/Demux<br>● Clock Enable Logic | ● Epoch Definition | ● Invocation command<br>● Input Data Address<br>● Output Data Address |
| Interface Layer | ● Command/Data/Timing Bus<br>● Arbitration Logic<br>● Function Block ID<br>● Input Addresses | ● Arbitration Logic<br>● Function Block ID<br>● Input Addresses | |

In the current embodiment of the application specific processor architecture, the attributes of the multi-purpose bus, such as the bus width or clocking speed, can be pre-synthesis programmed to match the needs of the specific application. This allows the integrated circuit designer to optimize the multi-purpose bus, hence allowing efficient gate count implementation.

Inherent within the design of each of the function blocks, values of certain parameters of the processing algorithms are implemented using registers which can be programmed with any desired values. The size of the these registers, and consequently the range of the programmable values of each register, can be pre-synthesis programmed to match the need of the specific application. In effect, this pre-synthesis programmability feature allows the integrated circuit designer to optimize the post-synthesis programmability of the design to the needs of the specific application, as discussed below, allowing additional efficiency in attaining low gate count implementation.

Also, the speed of the timing signals incorporated within the multi-purpose bus can be pre-synthesis programmed to match the needs of the specific application. This also allows the designer to optimize the gate count to the needs of the specific application.

On the post-synthesis side, the application specific processor architecture of the present invention also permits programmability of the data transfer between any two function blocks. Thus, each function block can be programmed with the memory address of the input and output data as an integral part of commanding each function block.

As a consequence of the moving boundary attribute of the multi-purpose bus, this bus can be viewed as being post-synthesis programmable to adapt the throughput needed to transfer data and commands between the interconnected function blocks. Since each function block in the application specific processor could have different data and command structure size, the invocation of the function blocks in accordance with a sequence of programmed instructions is in effect programming the multi-purpose bus in real-time to accommodate the data and command needs of the integrated function blocks.

Thus, as example of the post-synthesis programmability in the current embodiment, a "FILTER" instruction could be configured to process data thus:

FILTER(IN=@ received_single_sample_bus, OUT=@ filtered_signal_bus, TYPE=FIR, NCOEF=Num_Coef, COEF=MF_Coef, TIME=Burst_CLK)

The first two arguments of the FILTER instruction sets up the connectivity of the filter. The first argument connects the filter input to the received signal bus, and the second argument connects the filter output to the filtered signal bus. The filter function will receive its input data from the received signal bus and write the resultant output data to the filtered signal bus referenced in FIG. 6. The next three arguments instructs the FILTER function block to execute a Finite Impulse Response (FIR) type filter with the filter coefficients Num_Coef. The Num_Coef is a project specific constant, or equate, which is setup in the project database. The project database may specify such equate as data stored in a specific address in constant ROM (Read-only memory) or user configurable in RAM (Random Access Memory). The last argument of the FILTER instruction commands the filter function block to invoke on the epoch of the burst clock provided by the Command/Data/Timing bus.

Parameters not explicitly defined in the instruction declaration are set to default values. Default parameters for each application syntax may include internal bus widths, operating rates, architecture configurations, and miscellaneous configuration/control options. For example, the FILTER instruction can be fully configured using the default values with no explicitly defined parameters. In this option the FILTER instruction in the program would be FILTER().

In one embodiment, the instructions would be compiled and stored in a shared memory syntax, as described below, which may comprise RAM memory, with the program downloaded to the ASP at power-up. In an alternative embodiment, the shared memory syntax would comprise ROM instead or even complementing RAM, the ROM for storing the program and RAM for user-accessible and modifiable registers. In yet another embodiment, instructions or configuration parameters dependent on only one functional block could be stored in the respective block The ASP architecture of the present invention targets implementations incorporating microelectronic integrated circuit technologies as well as board level technologies. Because the constituent processing and invocation mechanisms are matched to a specific application, the ASP architecture offers the maximum throughput which can be achieved by the target technology with sufficient programming flexibility to realize the low cost benefits achieved by aggregating the production volume of several product markets with common processing needs. For example, it is possible to build a library in which the digital communication signal processing needs for the combined markets of several products, including cellular telephones, wireless local area networks, personal communication networks, digital cable networks, etc., are accommodated. The architecture also enables leveraging the expertise of applications experts to realize lower product design cost and shorter time-to-market advantages and allows system level object oriented programmability, which obviates the need for in-depth understanding of the complex aspects of a specific application processing. The rapid development cycle of efficient application specific circuits with inherent power management capabilities and the programming flexibility for addressing product enhancement and evolution with vastly reduced development cost are major benefits of this architecture.

One application of the ASP architecture of the present invention is a communication ASP (CASP). Table 2 shows the names and description of some of the application syntax in a library which can be used to design various CASPs.

TABLE 2

Communication Application Syntax Library

| Name | Description |
| --- | --- |
| Interleaver | Convolutional and block interleaving with selectable row and column sizes. |
| Deinterleaver | Convolutional and block deinterleaving with selectable row and column sizes. |
| Encoder | Convolutional encoding with selectable rate, constraint length, and taps. |
| Decoder | Convolutional decoding with selectable rate, constraint length, and taps. |

TABLE 2-continued

Communication Application Syntax Library

| Name | Description |
| --- | --- |
| CRC Checker | Cyclic Redundancy Code checker with selectable length and taps. |
| Reed-Solomon Decoder | Reed-Solomon decoding with selectable length. |
| BCH Decoder | BCH decoding with selectable length and syndrome calculation. |
| FIR Filter | FIR filter with selectable number of coefficients and coefficient values. |
| IRR Filter | IRR filter with selectable coefficient values. |
| PSK Demodulator | PSK demodulator with selectable type and rate. |
| FSK Demodulator | FSK demodulator with selectable number of tones, tone frequencies, and rates. |
| Correlator | Correlator with selectable length and taps. |
| State Machine | Generic State Machine with selectable number of states, boundary conditions, and outputs. When used in conjunction with application specific microcode, it provides implementation of a wide variety of application syntax. |

An exemplary communication system designed using the ASP architecture of the present invention is a modulator/demodulator (modem) implementing a spread spectrum, frequency hopping (SS/FH), time division multiple access (TDMA) signaling scheme. The SS/FH aspect is provided by randomization of the carrier frequency of each burst. The TDMA aspect is provided by dividing time on the channel into TDMA bursts, with the multiple access duty cycle defined as a frame. The time position of an assigned burst within a frame is randomized. The multiple access scheme assigns dynamically on demand a data stream to each burst to support the user data. Each burst is defined by a set of parameters shown in Table 3.

TABLE 3

SS/FH Burst Parameters of Modem 400

| | |
| --- | --- |
| Carrier Frequency | Carrier frequency derived using a specified pseudo random code (PN-Code) generator. |
| Modulation type | Binary Phase Shift Keying (BPSK) or Quaternary Phase Shift Keying (QPSK). |
| Matched Filter Parameters | Coefficients for matched filter. |
| Data Rate | Variable number of symbols per burst. |
| Interleaver Parameters | Variable number for length and width. |
| Coding Type | None or convolutional encoding/Viterbi decoding. |
| Coding Parameters | Rate = ½, ¾, ⅞; Constraint length = 7, 9. |

Figure 6:
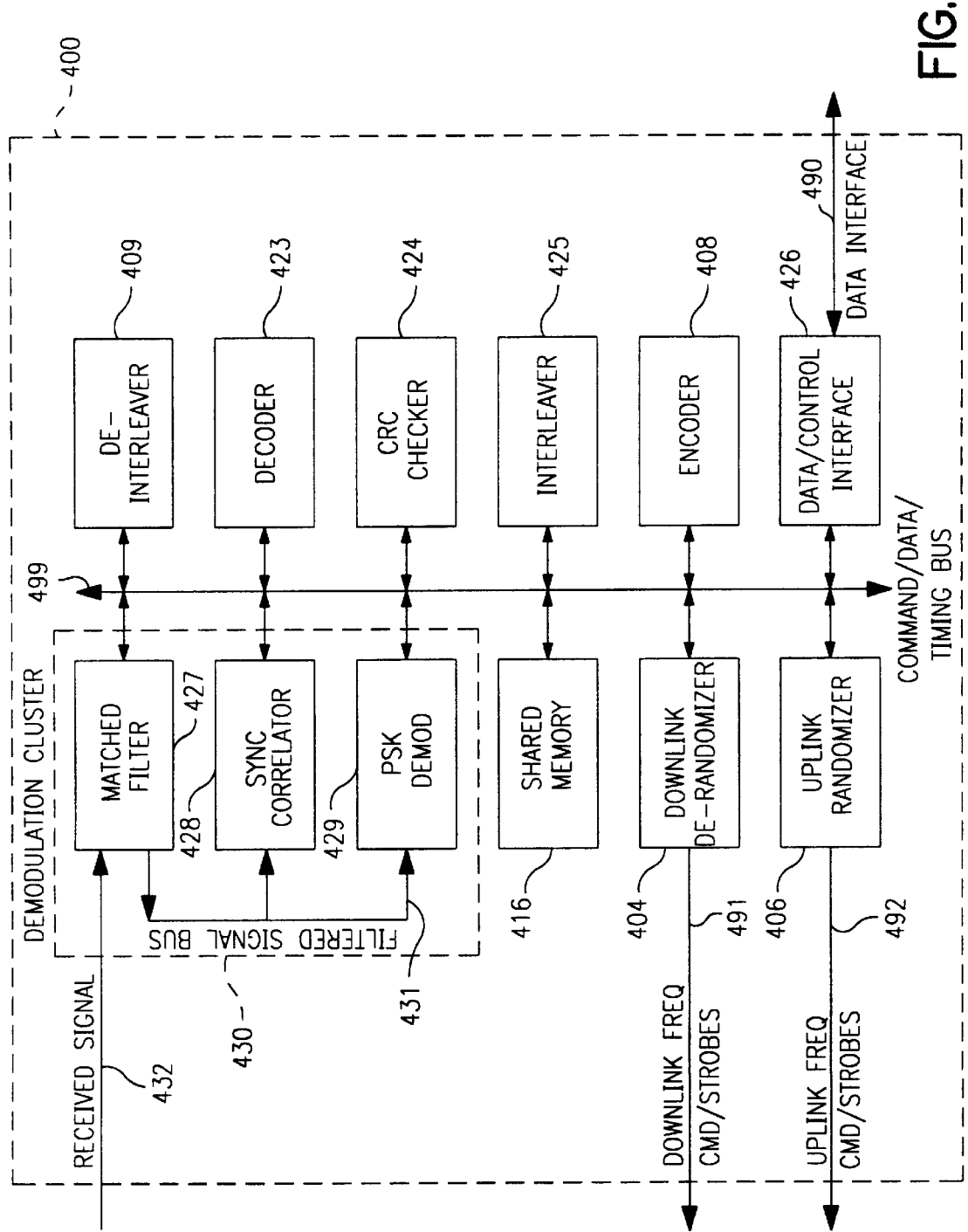
FIG. 6 is a block diagram of a modem implemented using the communication application specific architecture of the present invention.

FIG. 6 depicts a top level block diagram of a SS/FH TDMA modem 400 implemented using the CASP. Specifically, the application syntax utilized in the example are shown in Table 4. These application syntax communicate through a command/data/timing bus 499, where each application syntax can be invoked (or activated) at different rates. Bus 499 is a realization of the Command/Data/Timing bus 110 of FIG. 1.

Each application syntax defined in modem 400 accepts an input configuration command which governs the data transformation and an input timing command which governs the invocation time. This command structure has been defined as Syntax (C,T) in the ASP architecture of FIG. 1. An application syntax, upon invocation, sets its parameters to the appropriate values, processes the input data, and gates its input clock off until the next invocation command occurs. Thus, power savings are inherently provided by gating the clock off. The application syntax defined in modem 400 have different application syntax logic (i.e., block 125 of FIG. 1) for performing different signal processing functions. However, all of these application syntax utilize the same interface structure to connect to the command/data/timing bus 499.

syntax writing the data, while the 'read' pointer is maintained by the application syntax reading the data. Each application syntax examines the 'write' and 'read' pointers to determine if enough data is available to process and will shutdown until the next frame clock epoch when data is not available. In addition to providing inherent power saving,

TABLE 4

Application Syntax Used to Implement CASP Modem 400

| Name | Description |
| --- | --- |
| Downlink De-Randomizer | An autonomous application syntax which performs burst-by-burst control of the demodulation cluster and regenerates downlink burst/frame clocks and downlink synthesizer frequency hopping commands. Implemented using the state machine syntax of Table 2. |
| Uplink Randomizer | An autonomous application syntax which generates uplink burst/frame clocks and uplink synthesizer commands containing the uplink modulation and frequency hopping commands. Implemented using the state machine syntax of Table 2. |
| Matched Filter | Part of demodulation cluster configured at the burst rate to perform matched filtering of the received signal. |
| PSK Demodulator | Part of demodulation cluster configured at the burst rate to perform BPSK or QPSK demodulation of the filtered signal. |
| Sync Correlator | Part of the demodulation cluster configured at the burst rate to calculate synchronization metrics for time and frequency tracking. |
| Deinterleaver | Autonomous application syntax configured dynamically to deinterleave data at the frame rate. |
| Decoder | Autonomous application syntax configured dynamically to decode data at the frame rate. |
| CRC checker | Autonomous application syntax configured dynamically to check the decoded data stream for errors. |
| Encoder | Autonomous application syntax configured dynamically to encode data at the frame rate. |
| Interleaver | Autonomous application syntax configured dynamically to interleave data at the frame rate. |
| Shared Memory | Autonomous application syntax consisting of a block of memory with capability to interface with internal Command/Data/Timing Bus. |
| Data/Control Interface | Autonomous application syntax designed to connect an external bus to the internal Command/Data/Timing Bus. |

In modem 400 of FIG. 6, both the centralized as well as the distributed control aspects of the ASP architecture are used to support dynamic modem reconfiguration on a burst-by-burst basis and data processing on a frame-by-frame basis. The centralized control is provided by a downlink de-randomizer 404 and an uplink randomizer 406, which coordinate the downlink and uplink digital signal processing, respectively, on a burst-by-burst basis. The distributed control is provided by autonomous application syntax on a frame-by-frame basis for data processing. Specifically, these autonomous application syntax are the encoder 408, the interleaver 425, the CRC checker 424, the decoder 423, and the deinterleaver 409.

The modem 400 incorporates a shared memory syntax 416, which provides a loose coupling between all application syntax. This eliminates the hardware overhead of multiple separate data and address lines as well as separate memories. Each application syntax performs its particular task(s) on its input data and passes its output to the next application syntax via the shared memory syntax 416.

Figure 7:
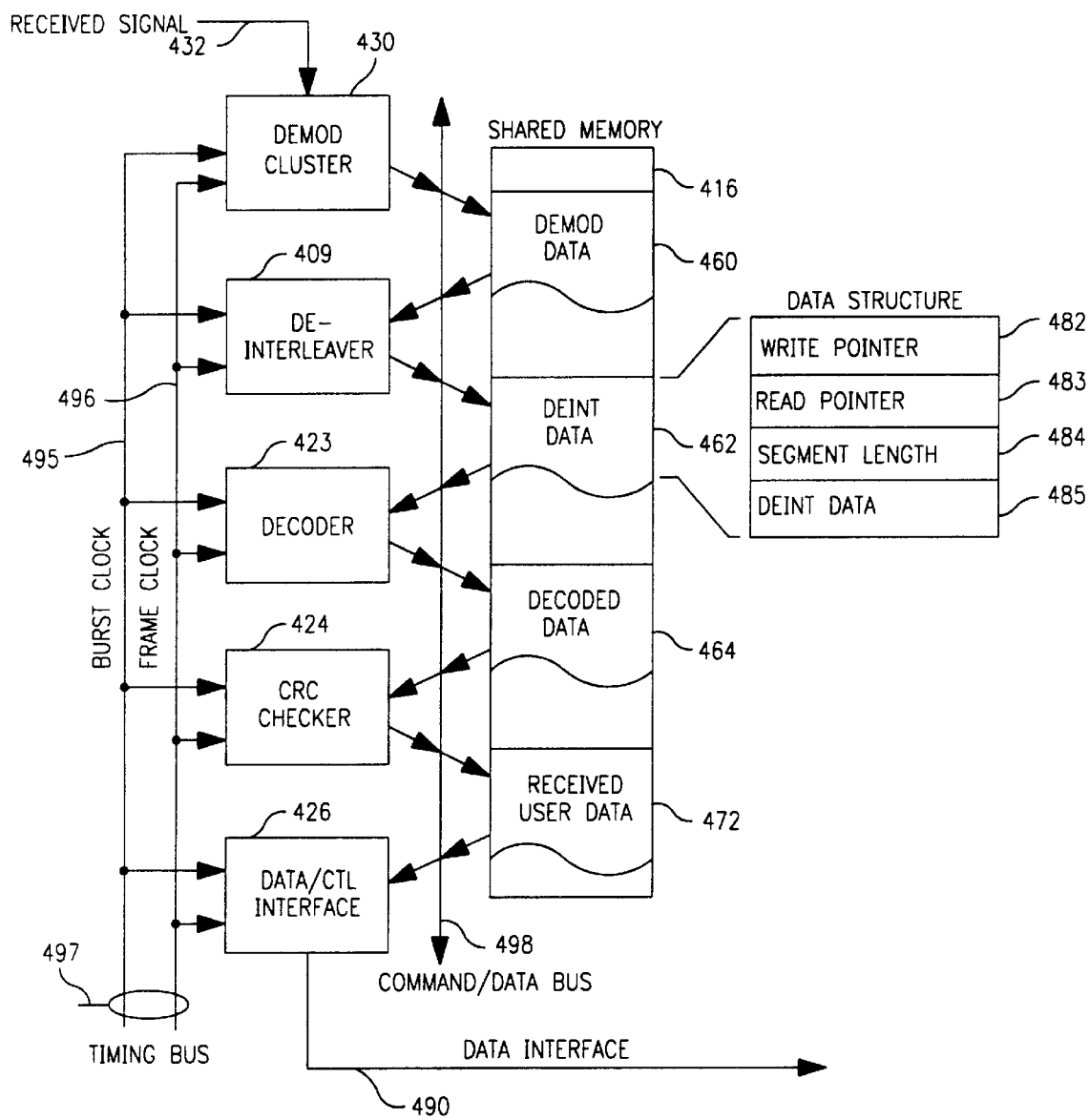
FIG. 7 is a data flow diagram of the modem of FIG. 6.

As illustrated in FIG. 7, data and control are transferred between application syntax via preassigned segments in shared memory syntax 416. Like elements in FIGS. 6 and 7 have like numerals. Associated with each preassigned memory segment (i.e., segments 460, 462, 464, and 472) is a 'write' pointer (such as pointer 482), 'read' pointer (such as pointer 483), 'segment length' value (such as value 484), and the data to be processed (such as deinterleaved data 485). The 'write' pointer is maintained by the application this feature allows data to be processed only when available and at the desired throughput.

The operation of the downlink processing performed by modem 400 is now described. The signaling structure on the downlink incorporates a time-division multiplexed, frequency hopped waveform with varying burst data rates multiplexing communication data, access control data, and synchronization information. The synchronization information is demodulated with the sync correlator 428 for acquiring and tracking the received signal. The communication data and the access control data are demodulated with the PSK demodulator 429. Both application syntax 428 and 429 output data into shared memory syntax 416 for further data processing by other autonomous application syntax.

In modem, matched filter 427, sync correlator 428 and PSK demodulator 429 are grouped into a demodulation cluster 430. It demodulates the received signal in real-time at the burst rate and places the demodulated data in shared memory syntax 416. Matched filter 427 matches the communication characteristic of the incoming digital signal, thereby providing filtered samples to sync correlator 428 and PSK demodulator 429. To accommodate the high bandwidth of the filtered signal, the components of demodulation cluster 430 are connected by a high bandwidth bus, called the filtered signal bus 431.

In modem 400, centralized control of the demodulation cluster 430 is performed by the downlink de-randomizer 404. Specifically, the downlink de-randomizer 404 performs the following functions:

(1) generates and synchronizes the PN-Code word,
(2) calculates the hopped carrier frequency,
(3) generates the corresponding frequency command and strobe for a downlink synthesizer external to modem 400,
(4) generates all the necessary clocks, including burst clock and frame clock, and
(5) configures the demodulation cluster 430 on a burst-by-burst basis.

Configuration of the demodulation cluster 430 consists of setting up the matched filter 427 to the burst data, and selecting either sync correlator 428 or PSK demodulator 429. Based on a generated PN-Code, the downlink de-randomizer 404 identifies the incoming burst index. Using this identified burst index, the downlink de-randomizer 404 accesses the shared memory syntax 416 to determine the burst configuration parameters contained in the downlink "command template". The command template is the machine language code resulting from compilation of the CASP instruction program written specifically for this modem application. The information in the command template (program) defines the modem operation and can be changed according to the changing downlink parameters. Information in the command template (program) defines the signal processing commands as well as data processing commands. The signal processing commands are used to configure the demodulation cluster 430, while the data processing commands are used to configure the autonomous data processing syntax. The downlink de-randomizer 404 writes a timing command (T) to each of the components of the demodulation cluster 430, which configures the demodulation cluster 430 to be activated at the burst clock epoch. Prior to the burst clock epoch, the downlink de-randomizer 404 writes configuration commands (C) to each component of the demodulation cluster 430. The demodulation cluster 430 activates on the burst clock epoch and processes the data as defined in the configuration command supplied by the downlink de-randomizer 404. This is an example of dynamic reconfiguration at the burst clock epoch.

The demodulated data is further processed by autonomous application syntax. These application syntax are activated at the downlink frame clock epoch, process the data, and then shutdown until the next downlink frame clock epoch. This results in substantial power savings during operation. In modem 400, each autonomous application syntax maintains its input and output in shared memory syntax 416. FIG. 7 shows the data flow among the centralized controlled demodulation cluster 430 and the distributed controlled data processing syntax. Signals received by modem 400 on line 432 are demodulated by demodulation cluster 430. The demodulated data is placed in a demodulation data segment 460 of shared memory syntax 416 via command/data bus 498, which consists of a portion of command/data/timing bus 499. This demodulated data is subsequently processed by deinterleaver 409. The result is stored in a deinterleaver data segment 462 in shared memory syntax 416. The deinterleaved data is subsequently processed by decoder 423. The decoded data is stored in a decoded data segment 464 in shared memory syntax 416. The decoded data is then checked for errors by CRC checker 424 and placed in a received user data segment 472. The received user data can then be extracted by an external entity via the data/control interface syntax 426 on the external bus 490.

The configuration commands of the autonomous application syntax are provided as part of the downlink command template (program) in shared memory syntax 416. As described previously, the instructions for each of these application syntax consist of two arguments; namely, the command argument (in this case, the configuration command) and the time argument (in this case, the invocation time). Upon invocation, the application syntax will decode the command argument (C) and configure its parameters accordingly. Each application syntax decodes the time argument (T) to determine the invocation epoch. The time argument can be implemented as a command to select either the burst clock 495 or the frame clock 496 of the timing bus 497, which is a part of command/data/timing bus 499, and use it to establish a periodic invocation epoch.

Figure 8:
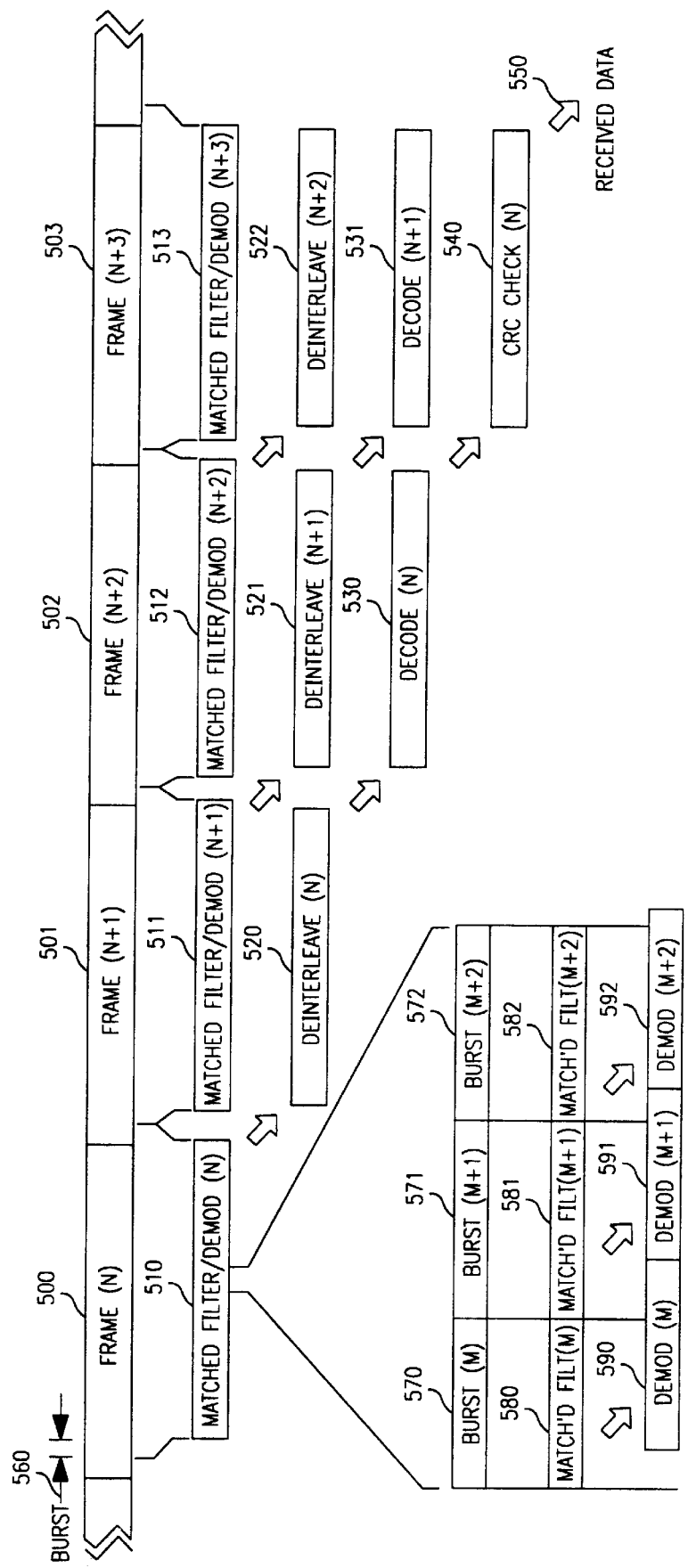
FIG. 8 is a timing diagram showing the pipeline processing feature of the modem of FIG. 6.

The pipelining capability of the ASP architecture is used in modem 400, where the time arguments of the CASP command template (program) were chosen to perform the above described operations in a processing pipeline. FIG. 8 shows a programmed downlink processing pipeline implemented in modem 400. The input signal on line 432 is demodulated in real time at the burst rate, while deinterleaving, decoding, and CRC checking are processed in subsequent frames at the frame rate.

The downlink processing pipeline implemented in modem 400 is detailed here. Through programming of the application syntax forming modem 400, the received signal 432 is processed in accordance with time on the channel divided into TDMA bursts, with the multiple access duty cycle defined as a frame. In FIG. 8, the progression of time is illustrated as a sequence of frames having sequentially increasing frame numbers. Specifically, the sequence shown in FIG. 8 is frame (N) 500, followed by frame (N+1) 501, followed by frame (N+2) 502, followed by frame (N+3) 503, where N is an arbitrary integer counting the number of frames. Within any given frame, the progression of time is illustrated as a sequence of bursts 560 having sequentially increasing bursts numbers. Specifically, the sequence shown in FIG. 8 is burst (M) 570, followed by burst (M+1) 571, followed by burst (M+2) 572, where M is an arbitrary integer counting the number of bursts within a frame.

The downlink processing pipeline implemented in modem 400 starts with matched filter/demodulation (N) 510 performed on the received data 432 of frame (N) 500. Specifically, the following programmed sequence of operations is performed:

(a) Matched filter (M) 580 is performed on burst (M) 570 of frame (N) 500.
(b) Demodulation (M) 590 is performed on the matched filter (M) 580 output data.
(c) Matched filter (M+1) 581 is performed on burst (M+1) 571 of frame (N) 500.
(d) Demodulation (M+1) 591 is performed on the matched filter (M+1) 581 output data.
(e) Matched filter (M+2) 582 is performed on burst (M+2) 572 of frame (N) 500.
(f) Demodulation (M+2) 592 is performed on the matched filter (M+2) 582 output data.
(g) Et cetera until all designated bursts within frame (N) 500 have been matched filtered and demodulated.
(h) In the following frame, deinterleave (N) 520 is performed on the demodulation (M) 590, demodulation (M+1) 592, demodulation (M+2) 592, etc., output data.
(i) In the following frame, decode (N) 530 is performed on the deinterleave (N) 520 output data.
(j) In the following frame, CRC check (N) 540 is performed on the decode (N) 530 output data.
(k) In the following frame, received data 550 is extracted from the CRC check (N) 540 output data and passed to an external entity.

Similarly, frame (N+1) is processed as follows:
  (a) Matched filter (M) 580 is performed on burst (M) 570 of frame (N+1) 501.
  (b). Demodulation (M) 590 is performed on the matched filter (M) 580 output data.
  (c) Matched filter (M+1) 581 is performed on burst (M+1) 571 of frame (N+1) 501.
  (d) Demodulation (M+1) 591 is performed on the matched filter (M+1) 581 output data.
  (e) Matched filter (M+2) 582 is performed on burst (M+2) 572 of frame (N+1) 501.
  (f) Demodulation (M+2) 592 is performed on the matched filter (M+2) 582 output data.
  (g) Et cetera until all designated bursts within frame (N+1) 501 have been matched filtered and demodulated.
  (h) In the following frame, deinterleave (N+1) 521 is performed on the demodulation (M) 590, demodulation (M+1) 591, demodulation (M+2) 592, etc., output data.
  (i) In the following frame, decode (N+1) 531 is performed on the deinterleave (N+1) 521 output data.
  (j) In the following frame, CRC check (N+1) 541 is performed on the decode (N+1) 531 output data.
  (k) In the following frame, received data 550 is extracted from the CRC check (N+1) 541 output data and passed to an external entity.

The downlink processing pipeline continues indefinitely with the same pattern repeating until modem 400 is reconfigured into a different mode or turned off.

The programming capability of the CASP modem 400 allows any application syntax to be commanded by the time argument to select one of the clocks provided on the command/data/timing bus 499 and use the selected clock to generate invocation epochs by counting modulo (N) of the selected epoch or invoke when the selected clock reaches a specific value. For example, the CASP command template (program) defines the specified encoder invocation period to consist of multiple frames. In this example, the encoder input data will accumulate in its designated shared memory segment until processed by the encoder upon invocation.

The instruction program for instructing the CASP Modem of FIG. 6 to process incoming data would be as follows:

ment allows for the appropriate processing of synchronization information, while the ENDIF indicates, as expected, the end of these two branches. The compiler will map this IF instruction into a command template which can be specified by the programmer. The programmer then fills this command template with the specific structure of the TDMA frame containing the data and synchronization bursts. This template is stored as part of the compiled program and is used to identify the type of received burst.

The above PSK_DEMOD instruction is described as follows. Based on the content of the frame structure command template compiled with the program, each received burst is identified as either a synchronization (SYNC) burst or a data burst. When a received burst is identified as a data burst, the PSK_DEMOD instruction commands the PSK demodulator function block to process the filtered received signal samples. The PSK_DEMOD instruction commands the PSK demodulator to extract it's input from the Filtered Signal Bus (FIG. 6) and route the resultant output to a specified memory location in the shared memory block. The structure of the shared memory function block is also contained as part of the compiled program via the project database. The next two arguments of the instruction specify the specific configuration of the PSK demodulator in terms of the type of PSK symbol to be demodulated (for example BPSK or QPSK) and the received symbol rate. The TIME argument commands the PSK demodulator to be invoked at the burst clock rate.

The SYNC instruction is similar to the PSK demodulator instruction with the exception that the important parameters for synchronization include the sync coefficients, number of coefficients, and the exact synchronization type.

The convolutional deinterleaver (CONV_DEINT), convolutional decoder (CONV_DECODE), CRC checker (CRC), and Data Interface (DATA_IF) are all frame processes. Each of these processes are invoked at the frame clock, extract data from shared memory, perform the required data transformation, output the data back into shard memory and then go back to sleep. Parameters such as CDT bus structure, shared memory buffer structure, and internal bit widths are defined in the project level database. For brevity's sake only the convolutional deinterleaver will be discussed here. The other frame processes have very similar arguments and can be easily extracted once the convolutional deinterleaver is understood.

---

```
** Demodulator Cluster
FILTER(IN =@ received_signal_sample_bus, OUT =@ filtered_signal_bus, TYPE = FIR, NCOEF = Num_Coef,
COEF = MF_Coef, TIME = Burst_CLK)
IF Data_BURST THEN
    PSK_DEMOD(IN = Samp_Bus, OUT =@ Demod_Data, TYPE =@ Demod_Type, SYMB = Symb_rate,
TIME = Burst_CLK)
ELSEIF SYNC_BURST
    SYNC(IN = Samp_Bus, OUT =@ Sync_Buf, TYPE =@ SYNC_Type, SYNC_COEF =@ S_Coef,
SYMB = Symb_rate, TIME = Burst.CLK)
ENDIF
** Frame Processes
CONV_DEINT(IN =@ Demod_Data, OUT =@ Deint_Data, NUM = Num_Data, ROW = NRows, COL = NCol, STEP = NStep,
TIME = Frame_CLK)
CONV_DECODE(IN =@ Deint_Data, OUT =@ Dec_Data, NUM = Num_Data, K = Rate, LEN = Conv_Len,
TAPS = Conv_Taps, TIME = Frame_CLX)
CRC(IN =@ DEINT_Data, OUT =@ CRC_Data, NUM = Num_Data, TAPS = CRC_Taps, LEN = CRC_Len,
TIME = Frame_CLK)
DATA_IF(IN =@ CRC_Data, OUT = D_Bus, TIME = Frame_CLK)
```

---

The FILTER instruction has been described previously above. The IF statement following the FILTER instruction allows for performing the appropriate processing on two different types of received TDMA burst, the ELSEIF state- The first two arguments of the CONV_DEINT instruction define the connectivity of the module. That is, the first two arguments inform the CONV_DEINT where in shared memory its inputs are located, and where in shared memory to place its outputs. In this case the CONV_DEINT will get its inputs from the Demod_Data buffer in shared memory, and output its data into the Deint_Data located in shared memory. Buffer parameters such as structure, length and location are located in the project level database. The next argument informs the CONV_DEINT how many soft decision bits to deinterleave per invocation. The next three arguments inform the CONV_DEINT of the exact configuration to be invoked. In this case the convolutional deinterleaver will be nrows×ncol. Finally the last argument commands the convolutional deinterleaver function to be invoked at the frame rate.

Because it is obvious for persons skilled in the art to build the uplink portion of modem 400 once the downlink portion is understood, only the downlink portion is described here. Consequently, the structure and operation of the uplink portion is not described here.

What is described is the ASP architecture of the present invention. It should be obvious to one of ordinary skill in the art to apply the invention to various types of applications. While only several preferred embodiments of the invention have been presently described in detail herein, many alterations and modifications can be made without departing from the spirit and the scope of the invention. Accordingly, it is intended that the scope of the invention is only limited by the appended claims.

We claim:

1. A programmable application specific processor architecture for execution of a set of high-order instructions, comprising:

a selected set of programmable application elements interconnected to cooperatively perform a specified application, each of the application elements being invoked by a corresponding high-order instruction in the set of high-order instructions, at least one of the application elements comprising:

an interface block for providing interface access logic, the interface block receiving a corresponding high-order instruction, the corresponding high-order instruction including a time argument;

an application logic block coupled to the interface block to receive the corresponding high-order instruction, the application logic block performing a high-order function as instructed by the corresponding high-order instruction; and a clock logic block coupled to the interface block and to the application logic block for providing timing control, the clock logic block activating the application logic block at an invocation time, the invocation time being determined by the time argument.

2. The architecture as recited in claim 1 further comprising a bus connecting all of the application elements for communicating signals among them.

3. The architecture as recited in claim 1 wherein the application logic block is parametrically programmable.

4. The architecture as recited in claim 1 wherein the application elements are selected from a library of application elements.

5. The architecture as recited in claim 1 wherein some of the application instructions are programmed to invoke the corresponding application elements simultaneously so that the corresponding application elements operate in a parallel processing mode.

6. The architecture as recited in claim 1 wherein some of the application instructions are programmed to invoke the corresponding application elements in a staggered in time manner so that the corresponding application elements operate in a pipeline processing mode.

7. The architecture as recited in claim 1 wherein at least one of the application elements operates asynchronously.

8. The architecture as recited in claim 1 wherein the architecture is implemented on a single chip semiconductor device.

9. The architecture as recited in claim 1 wherein at least one of the application elements performs functions relating to wireless communications.

10. The architecture as recited in claim 2 wherein each of the application elements includes an interface block interfacing the corresponding application element to the bus for communicating signals among the application elements.

11. The architecture as recited in claim 10 wherein the interface blocks included in the application elements are substantially identical.

12. The architecture as recited in claim 10 wherein at least one of the interface blocks comprises a programmable interface to the bus.

13. The architecture as recited in claim 1 wherein:

the application logic block has an active state and a power-down state; and the clock logic block switches the application logic block into one of the active state and the power-down state.

14. The architecture as recited in claim 13 wherein the clock logic block sends a start signal to the application logic block to switch the application logic block to the active state, and wherein the clock logic block sends a done signal to the application logic block to switch the application logic block to the power-down state.

15. The architecture as recited in claim 1 wherein at least one of the application elements comprises a program for implementing the specified application, and the one of the application elements invokes at least one other application element by sending at least one of a configuration instruction and an invocation time instruction to the other application element.

16. The architecture as recited in claim 1 wherein at least one of the application elements accepts at least one of a configuration instruction and an invocation time instruction from another application element.

17. The architecture as recited in claim 2 wherein at least two of the application elements form a cluster, and the application elements included in the cluster communicate with each other via a cluster bus, the cluster bus being different from the bus.

18. The architecture as recited in claim 1 wherein at least one of the application elements is a shared memory element.

19. The architecture as recited in claim 18 wherein at least one of the application elements receives input data from the shared memory element and stores output data in a memory of the shared memory element.

20. The architecture as recited in claim 19 wherein at least one of the application elements controls the operation of at least one other application element by transmitting control signals thereto.

21. The architecture as recited in claim 20 wherein the controlling application element further transmits clock signals to the controlled application element, the operation of the controlled application element being scheduled by the clock signals.

22. The architecture as recited in claim 20 wherein one of the control signals includes a command having parametric arguments for configuring the controlled application element.

23. The architecture as recited in claim 1 wherein at least one of the application elements comprises a generic state machine including microcode, the state machine operating in conjunction with the microcode to implement the corresponding high-order instruction.

24. The architecture as recited in claim 1 wherein the application elements are selected and parametrically programmed such that the performance of the specified application is optimized.

25. The architecture as recited in claim 2 wherein the width of the bus is programmable.

26. A programmable processor architecture for execution of a set of high-order instructions, the architecture comprising:

an integrated circuit including a selected set of programmable application elements interconnected on a command/data/timing bus to cooperatively perform a specified application;

each of some of the application elements comprising:
      an application logic block for performing a predefined function;
      a clock logic block for providing the respective application element with timing signals and enabling the application logic block at the time its function is needed; and
      an interface block for receiving commands and data from and send commands and data to other application elements via the command/data/timing bus;

and being responsive to a high-order instruction associated with the corresponding application element, each instruction including:
      a command argument to set control parameters of the corresponding application element; and
      a time argument to determine the time the corresponding application element is invoked.

27. A method for designing an application specific processor, the method comprising:

(a) selecting a set of application elements from a library of application elements, each of the selected application elements corresponding to a high-order instruction in a set of high-order instructions, each of the high-order instructions including a time argument;

(b) programming each of the selected application elements by specifying arguments included in the corresponding high-order instruction; and (c) activating each of the selected application elements at an invocation time determined by the time argument included in the corresponding high-order instruction, so that the selected application elements cooperatively perform a specified application.

28. The method of claim 27 wherein steps (a), (b) and (c) are simulated on a computer.

29. The method of claim 27 wherein at least one of the high-order instructions includes a configuration argument and wherein step (b) includes the step of configurating at least one of the selected application elements by specifying the configuration argument included in the corresponding high-order instruction.

* * * * *